(12) United States Patent
Morovic et al.

(10) Patent No.: US 8,576,243 B2
(45) Date of Patent: Nov. 5, 2013

(54) DISPLAY-COLOR FUNCTION IMAGE CONVERSION

(75) Inventors: Peter Morovic, Barcelona (ES); Jan Morovic, Colchester Essex (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 477 days.

(21) Appl. No.: 12/900,856

(22) Filed: Oct. 8, 2010

(65) Prior Publication Data

US 2012/0086721 A1 Apr. 12, 2012

(51) Int. Cl.
| | |
|---|---|
| G09G 5/00 | (2006.01) |
| G09G 5/02 | (2006.01) |
| H04N 9/64 | (2006.01) |
| H04N 7/00 | (2011.01) |
| H04N 5/46 | (2006.01) |
| G06F 15/00 | (2006.01) |
| G03F 3/08 | (2006.01) |
| H04N 1/46 | (2006.01) |
| G06K 9/00 | (2006.01) |
| G06K 9/40 | (2006.01) |
| G06K 9/36 | (2006.01) |

(52) U.S. Cl.
USPC ........... 345/589; 345/581; 345/598; 345/600; 345/606; 345/643; 348/242; 348/552; 348/557; 348/739; 358/1.9; 358/518; 358/525; 382/167; 382/251; 382/254; 382/276

(58) Field of Classification Search
USPC ......... 345/581, 589–591, 596–601, 604, 606, 345/618–619, 643–644, 204, 690, 694; 348/177–179, 242, 251–254, 552, 557, 348/560, 571, 577, 607, 612, 630, 671, 674, 348/708, 739; 358/1.1, 1.9, 3.23, 3.24, 358/3.26, 518–519, 523, 525, 533–535, 358/447–448; 382/162, 166–167, 169, 251, 382/253, 254, 274, 276, 300

See application file for complete search history.

(56) References Cited

U.S. PATENT DOCUMENTS

| | | | |
|---|---|---|---|
| 5,544,284 A * | 8/1996 | Allebach et al. | 345/603 |
| 5,872,898 A | 2/1999 | Mahy | |
| 6,381,037 B1 | 4/2002 | Balasubramanian et al. | |
| 7,342,593 B2 | 3/2008 | Agar | |
| 7,710,597 B2 | 5/2010 | Edge | |
| 2003/0011797 A1* | 1/2003 | Takemoto | 358/1.9 |
| 2003/0184557 A1* | 10/2003 | Wen | 345/590 |
| 2005/0280845 A1* | 12/2005 | Hussie | 358/1.9 |
| 2005/0280847 A1* | 12/2005 | Cairns et al. | 358/1.9 |
| 2007/0223019 A1* | 9/2007 | Maeyama | 358/1.9 |
| 2009/0085924 A1* | 4/2009 | Ben-Chorin et al. | 345/591 |
| 2009/0310154 A1 | 12/2009 | Morovic et al. | |

(Continued)

OTHER PUBLICATIONS

Lau, Daniel L., "Blue- and Green-Noise Halftoning Models: A review of the spatial and spectral characteristics of halftone textures." IEEE Signal Processing Magazine, Jul. 2003, pp. 28-38.

Primary Examiner — Wesner Sajous

(57) ABSTRACT

A display system includes a display-color function image generator and a DCF image converter. The DCF image generator generates a DCF image from a source image. In the DCF image, each pixel is associated with a respective DCF configured to convert an input value to a display color value. The DCF image generator inputs values to respective DCFs to convert the DCF image to a displayable image having pixels associated with respective display colors.

15 Claims, 6 Drawing Sheets

(56) References Cited

U.S. PATENT DOCUMENTS

2010/0033494 A1* 2/2010 Klompenhouwer et al. . 345/590
2010/0289835 A1* 11/2010 Holub ........................... 345/690
2011/0251905 A1* 10/2011 Lawrence et al. ............... 705/15
2011/0285714 A1* 11/2011 Swic et al. .................... 345/428
2011/0285746 A1* 11/2011 Swic ............................. 345/597
2012/0139913 A1* 6/2012 Ben-Chorin et al. ......... 345/419

* cited by examiner

600

| # | NP INDEX | AREA COVERAGE (pp256) | COMPOSITION |
|---|---|---|---|
| | NEUGEBAUER PRIMARY (NP) VECTOR FOR LIGHT PINK | | |
| 1 | 55 | 126 | M1 drops |
| 2 | 2 | 69 | K1 drops |
| 3 | 59 | 27 | M1, Y1 drops |
| 4 | 5 | 24 | Y1 drops |
| 5 | 1 | 8 | W (no drops) |
| 6 | 3 | 2 | K2 drops |

DISPLAY-COLOR FUNCTION IMAGE CONVERSION

BACKGROUND

Inkjet printing is often used to reproduce continuous-tone, e.g., photographic, images using a limited number of ink colors. Inkjet printers commonly use a CMYK color model, e.g., in which the ink colors are cyan, magenta, yellow, and black. Ink colors can be 1) blended or 2) spatially averaged (or both) to provide colors not represented by the individual inks. For example, human perception will spatially average a pattern of red and yellow pixels to yield a perception (optical illusion) of orange. The yellow dots can be achieved using yellow ink, while the red dots can be achieved by blending or overlaying magenta and yellow inks.

"Continuous-tone" images may be converted to a printable, e.g., "half-tone", image form suitable for inkjet printing progressively. The difference between the color in the continuous-tone image and its "approximation" color in the target image is called a "quantization residual" or "error". "Error diffusion" is a technique in which the quantization residuals of previously processed pixels are distributed to neighboring pixels so that the target image will closely match the continuous tone image. Thus, for example, error diffusion can make it more likely that some neighbors of a red pixel are yellow where the objective is to provide a perception of orange.

DETAILED DESCRIPTION

Figure 1:
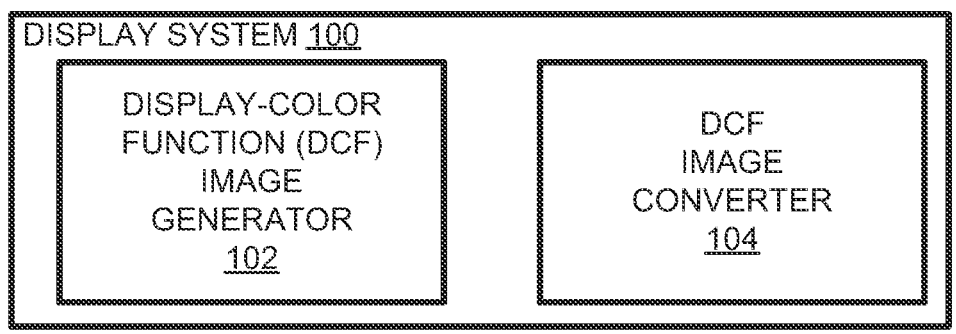
FIG. 1 is a schematic diagram of a display system in accordance with an embodiment.
Figure 2:
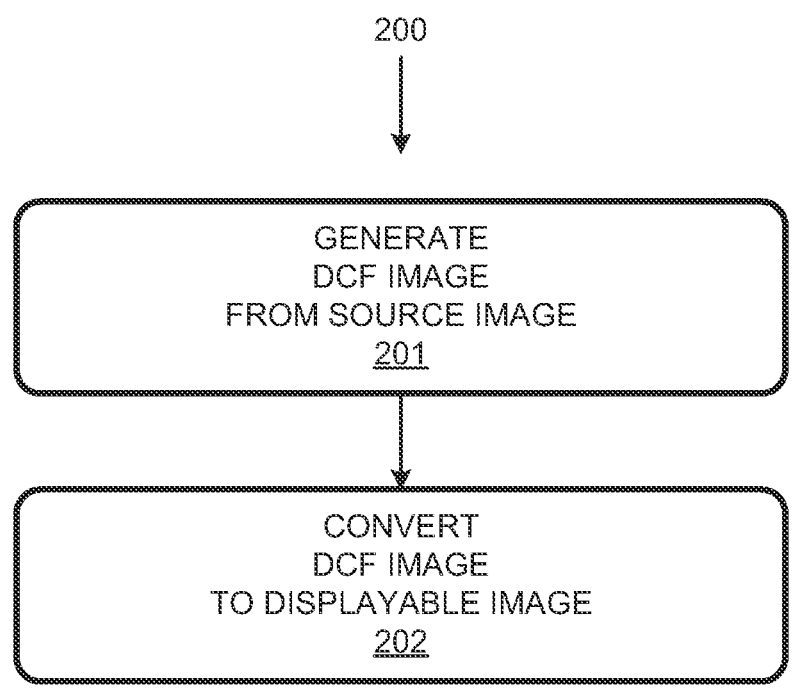
FIG. 2 is a flow chart of a process implemented by the display system of FIG. 1.

A display system 100 includes a display-color function (DCF) image generator 102 and a DCF image converter 104, as shown in FIG. 1. Display system 100 is configured to implement a process 200 flow-charted in FIG. 2. At process segment 201, generator 102 generates the DCF image from a source image. At process segment 202, converter 104 converts the DCF image into a displayable image. Display system 100 and process 200 provide high-performance, high-quality conversions of source images, as well as for efficient color management. For example, display color functions can be performed in parallel to provide for higher performance image conversion than what is obtainable using comparable conversions using error-diffusion (which requires some output colors to be computed before others, thereby limiting parallelism).

Herein, "displayed image" and "printed image" refer to human-viewable (HV) images, while "source image", "display-color function image", and "displayable image" refer to computer-readable representations of HV-images. Typically, there is also a human-viewable version of the source image, e.g., a source image on a monitor. Images of various dimensionalities are provided for, including two-dimensional and three-dimensional images. The images can be still images, moving images, or frames of moving images. In various embodiments, by way of example and not of limitation, the displayed image can be printed, lithographed, laser-etched, or displayed on an LCD or e-ink display, or displayed as a hologram. In fact, the display can be in the form of an array of just about any luminescent or reflecting objects, e.g., holiday lights or metallic gold and other metallic color stars.

A source image can be defined in any color space and may be a continuous tone image. For expository purposes, a source image 301 is represented in FIG. 3 having a 2×2 block of pixels; pixels S11, S12, and S21 are assigned a blue teal color, while pixel S22 is assigned a green teal color.

Herein, a "displayable image" is an image that can be displayed, e.g., on a monitor or by printing it on paper. The displayable images referred to herein tend to be non-continuous-tone images. The displayable image can be a digital representation that corresponds pixel-by-pixel with the to-be-displayed image.

A "display color" is a color that can be represented by a single pixel (without spatial averaging). A display color can be an elemental color (e.g., red in an RGB display system or cyan in a CMYK system), or a composite color (e.g., teal=blue+green in an RGB color system or red=magenta+cyan in a CMYK system). While "elemental" colors are referred to as "primary" colors elsewhere in the literature, herein, the term "primary" is used in the phrase "Neugebauer primaries"; Neugebauer primaries typically include both elemental and composite colors (but exclude colors that can only be perceived using spatial averaging).

Figure 3:
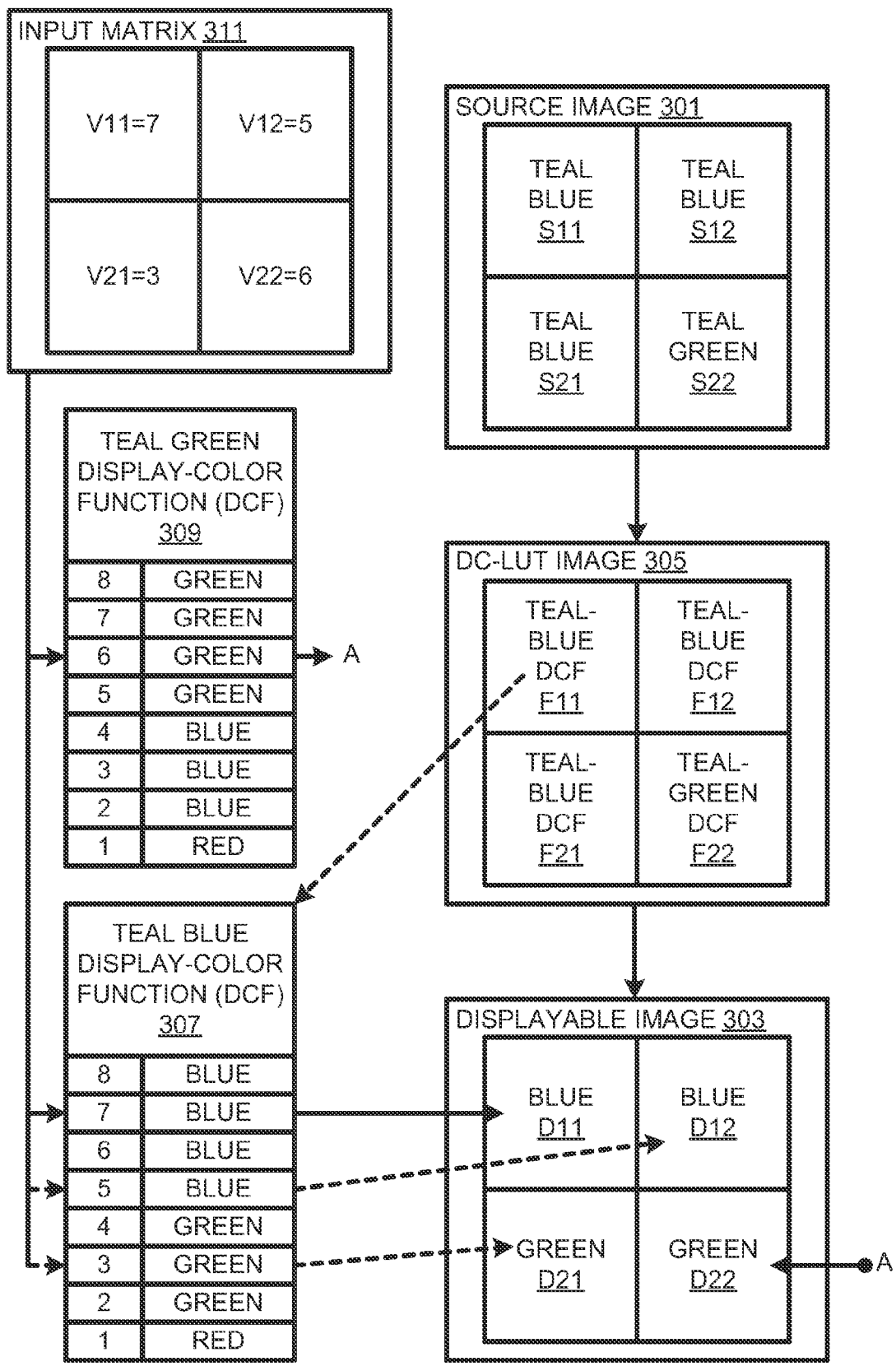
FIG. 3 depicts images, values, and functions used to explain certain concepts pertaining to the display system of FIG. 1.
Figure 4:
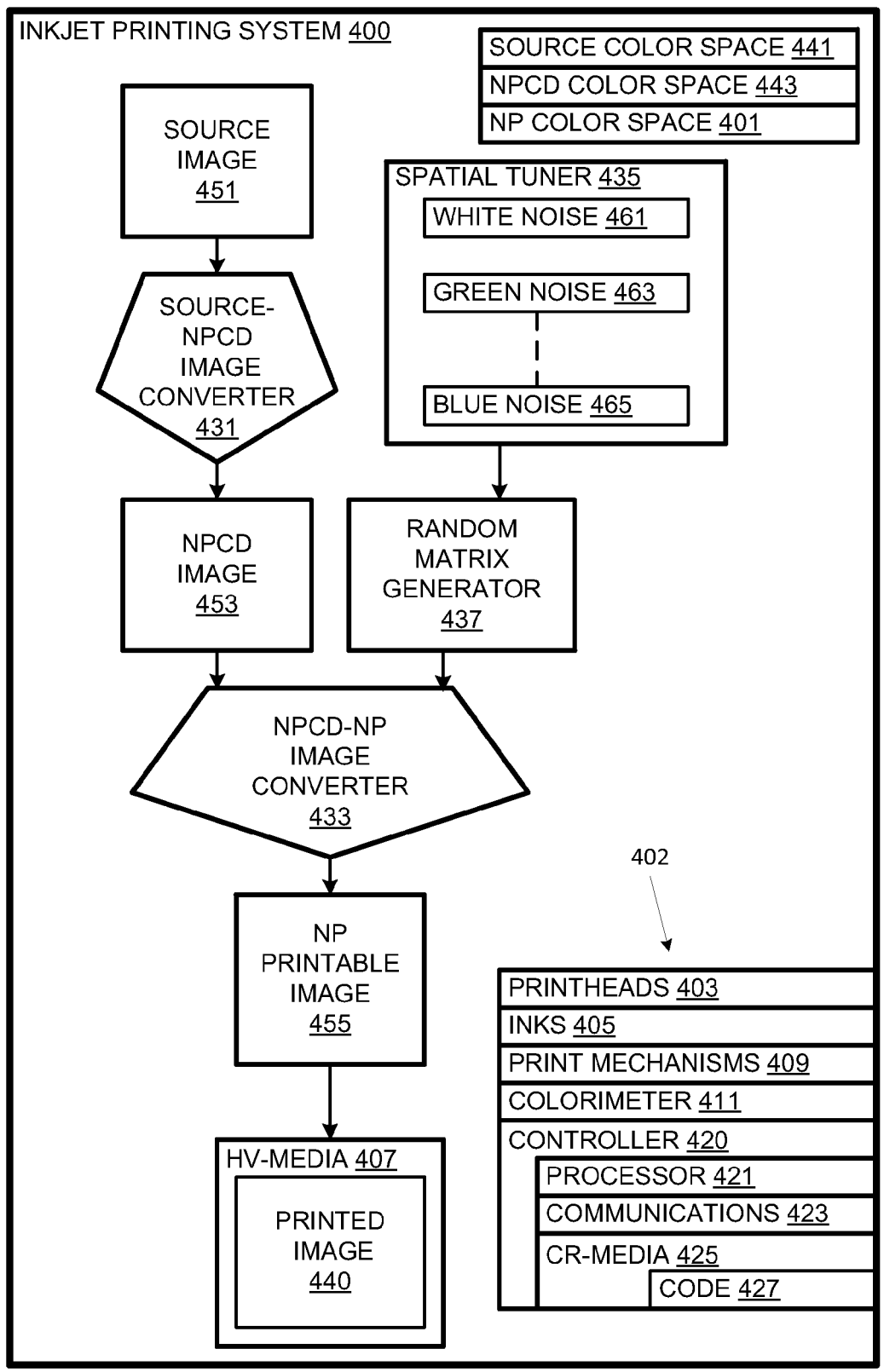
FIG. 4 is a schematic diagram of an inkjet printing system in accordance with an embodiment.

For expository purposes, a displayable image 303 is shown in FIG. 3 having a 2×2 block of pixels D11-D22 corresponding to pixels S11-S22 in source image 301. Pixels D11 and D12 are assigned a display blue color, and pixels D21 and D22 are assigned a display green color. While many embodiments provide for a wider range of display colors, for expository purposes, assume that image 303 is to be displayed on a system that provides for red, green, and blue colors to be displayed without any control over intensity.

Herein, a "display-color function image" or "DCF image" is an image having pixels wherein each pixel is assigned a display-color function. Herein, a DCF (e.g., y=f(x)) is used to convert an input numerical value (x) to a numerical or vector representation (y) of a display color. A DCF can typically and conveniently be represented by a look-up table (LUT), e.g., with the numerical values x as the indices and pre-calculated display colors y as the output. For example, a DCF image 305 is shown in FIG. 3 with a 2×2 block of pixels F11-F22 corresponding to block S11-S22 of source image 301 and block D11-D22 of displayable image 303. Pixel F11 is associated with a blue-teal DCF 307. Pixel F22 is associated with a green-teal DCF 309. The DCFs for pixels F12 and F21 are not shown separately in FIG. 3. However, their DCFs are identical to DCF 307 since pixels F11, F12, and F21 correspond to blue-teal pixels in source image 301.

Each DCF is configured to convert an input value to a display color (for the corresponding pixel). For example, DCF 307 is a look-up table configured to convert integer values 1-8 into (computer-readable representations of) red, green, and blue display colors. In the case of DCF 307, 1 is converted to red, 2-4 are converted to green, and 5-8 are converted to blue. Note that some display colors may correspond to more than one input value and some display colors may correspond to more input values than other display colors. In some DCFs, not all display colors are represented; e.g., all inputs to a red DCF might yield red. In DCF 307, blue appears in more instances than green because blue-teal is predominantly blue. In contrast, teal green DCF 309 contains more green than blue. A single value is associated with red in both DC-LUTS 307 and 309, as red is only weakly represented in teal blue and teal green.

Each DCF in DCF image 305 corresponds to a color in source image 301. At least as a first approximation, the proportions in which display colors appear in a DCF may correspond to the proportions those display colors would appear in a sufficiently large block in a displayed image that a viewer applying spatial averaging would perceive as the corresponding source color. Thus, the 4:3:1 representation of blue:green:red in DCF 307 is an area coverage distribution for teal blue. In practice, DCFs with many more than eight entries each would be required to precisely represent a continuous-tone source image. For example, 8-bit DCFs (256-entry look-up tables) could be used.

A source image can be converted to a display-space image having pixels associated with respective display-space color vectors that can be interpreted to indicate the relative regional (e.g., area) cover distributions with which the display colors would be represented in a color block corresponding to the source color for the pixel. A display-color vector can be converted to a DCF by 1) stacking the distributions to form a cumulative distribution; and 2) indexing the cumulative distribution to form a look-up table. This causes certain input value ranges to correspond to certain respective display colors. For example, in DCF 307, input values 5-8 correspond to blue while input values 1-4 do not. In DCFs 307 and 309 distributions are ordered from smallest (red) to greatest (blue for DCF 307 and green for DCF 309). In alternative embodiments, other ordering schemes are used; for example, display colors can be assigned index values and the display colors can be ordered according to the index numbers in a DCF. In the interest of efficiency, generator 102 computes DCFs directly from the source image without requiring an explicit intermediate determination of a display-space vector image.

While DCFs may be viewed as corresponding to regional (area) coverage distributions, display system 100 treats them as probability distributions corresponding to a likelihood that a pixel in the displayable image will be associated with a particular display color. For example, according to DCF 307, assuming all DCF input values are equally probable, there is a 4/8 (50%) a priori likelihood that display pixel D11 will be assigned a blue color and a 3/8 (37.5%) a priori likelihood it will be assigned a green color.

Converter 104 inputs values into respective DCFs to generate a displayable image. For example, input matrix 311 includes values V11-V22 to be applied respectively to the DCFs of pixels F11-F22 of DCF image 305. Thus, the value V11=7 is input to DCF 307 so that pixel D11 is assigned blue, and the value V22=6 is input to DCF 309 so that pixel D22 is assigned green. The values V12=5 and V21=3 result in blue and green being respectively assigned to pixels D12 and D21.

Some generally displeasing conversion artifacts can be avoided by selecting the input values randomly. For example, if a fixed pattern of values is applied to different blocks of a DCF image, so a human viewer may perceive repetitive patterns not present in the source image. A random selection of input values may avoid such repetitiveness.

However, random input values can result in clustering of minority display colors (e.g., red in teal blue and teal green), where a more uniform distribution of minority colors may give a more uniform and pleasing appearance. Such clustering can be rendered less likely by varying the quantization threshold for the random input values pixel-by-pixel. For example, the chances are 1:8 that a randomly selected integer value from 1-8 will result in a red pixel. This corresponds to a quantization threshold of 1. If the quantization threshold is set to two, the random input value will be an even number, in which case, the corresponding pixel cannot be red. Thus, varying quantization thresholds can be used to minimize clustering and provide a more uniform distribution. Note that image generator 102 may pre-compensate for the reduced presence of minority colors when quantization thresholds are varied.

Techniques have been developed for reducing clustering and low-spatial-frequency conversion artifacts in monochrome images. Due to the reduction of spatial low frequency spectral characteristics, the random input values can be said to be characterized by a green-to-blue noise color range (as green light and blue light tend to have lower low frequency content than white light). These techniques have been applied to individual color planes for use in color image conversions. Different thresholding patterns (matrices) are typically used for different color planes to minimize Moiré and other perceptual artifacts.

However, embodiments herein can use a single quantization threshold matrix for color image conversion. This avoids the perceptual artifacts that arise from the interaction of multiple matrices associated with multiple color planes. Also, using a single quantization matrix can result in a performance advantage over color conversion techniques that use multiple quantization threshold matrices.

Display system 100 provides a substantial performance advantage over systems that employ error diffusion. From the algorithm point of view, all pixels are independent of each other and can be processed in any order and all at the same time. This means that, in some cases, depending on the size of the image relative to the degree of parallelism obtainable by the image converter (e.g., a graphics processing unit), all the pixels of an image may be processed in parallel. In other cases, e.g., when memory or processing core limitations prevent an entire image from being processed at once, the image can be segmented into blocks and all of a single block's pixels that are processed in one cycle and the entire image can be processed in as many cycles as there are blocks.

An inkjet printing system 400 applies the foregoing principles in the context of a Neugebauer primary (NP) area coverage color space 401 to achieve accurate image control as well as high-performance, high-quality color printing. In particular, in system 400, the DCFs are based on Neugebauer primary cumulative distributions (NPCDs).

Printing system 400 has printer components 402 configured to print said displayable image. Components 402 include printheads 403 that can deliver inks 405 onto a human-viewable (HV) print media 407. System 400 includes print mechanisms 409 for moving media 407 longitudinally relative to printheads 403 and for moving printheads 403 transversely relative to print media 407. System 400 includes a colorimeter 411 for sensing the colors of a color characterization chart output on a print medium for characterizing NP color space 401.

A controller 420 of system 400 includes a processor 421, communications devices 423, and computer-readable (CR) media 425. Computer-readable media 425 is encoded with code 427 including instructions and data. Code 427 is configured to, when executed by processor 421, define a source-NPCD image converter 431, an NPCD-to-NP image converter 433, a spatial tuner 435, and a random matrix generator 437; code 427 is further configured to perform other tasks as described below to produce a printed image 440. In addition, code 427 defines NP color space 401, source color space 441, and NPCD color space 443. Furthermore code 427 characterizes a source image 451, an NPCD image 453, and a NP printable image 455.

Spatial tuner 435 permits selection of various quantization-threshold matrices that can be used by random matrix generator 437. Available matrices include a white-noise matrix 461, a green-noise matrix 463, and a blue-noise matrix 465. These matrices can be defined in terms of tunable parameters that can be adjusted, for example, to provide matrices that are intermediate between green and blue and that have more or less sharp peaks. A blue-noise matrix can be selected for print media, e.g., non-porous print media, for which the mixing of inks from adjacent pixels can be strictly controlled. A green noise matrix may be selected for print media, e.g., porous print media, for which ink from adjacent pixels may mix. In the latter case, colors in the converted image may be clustered to minimize the somewhat unpredictable mixing of different colors from adjacent pixels; in such a case, a green-noise matrix may better achieve the desired pixel clustering.

Figure 5:
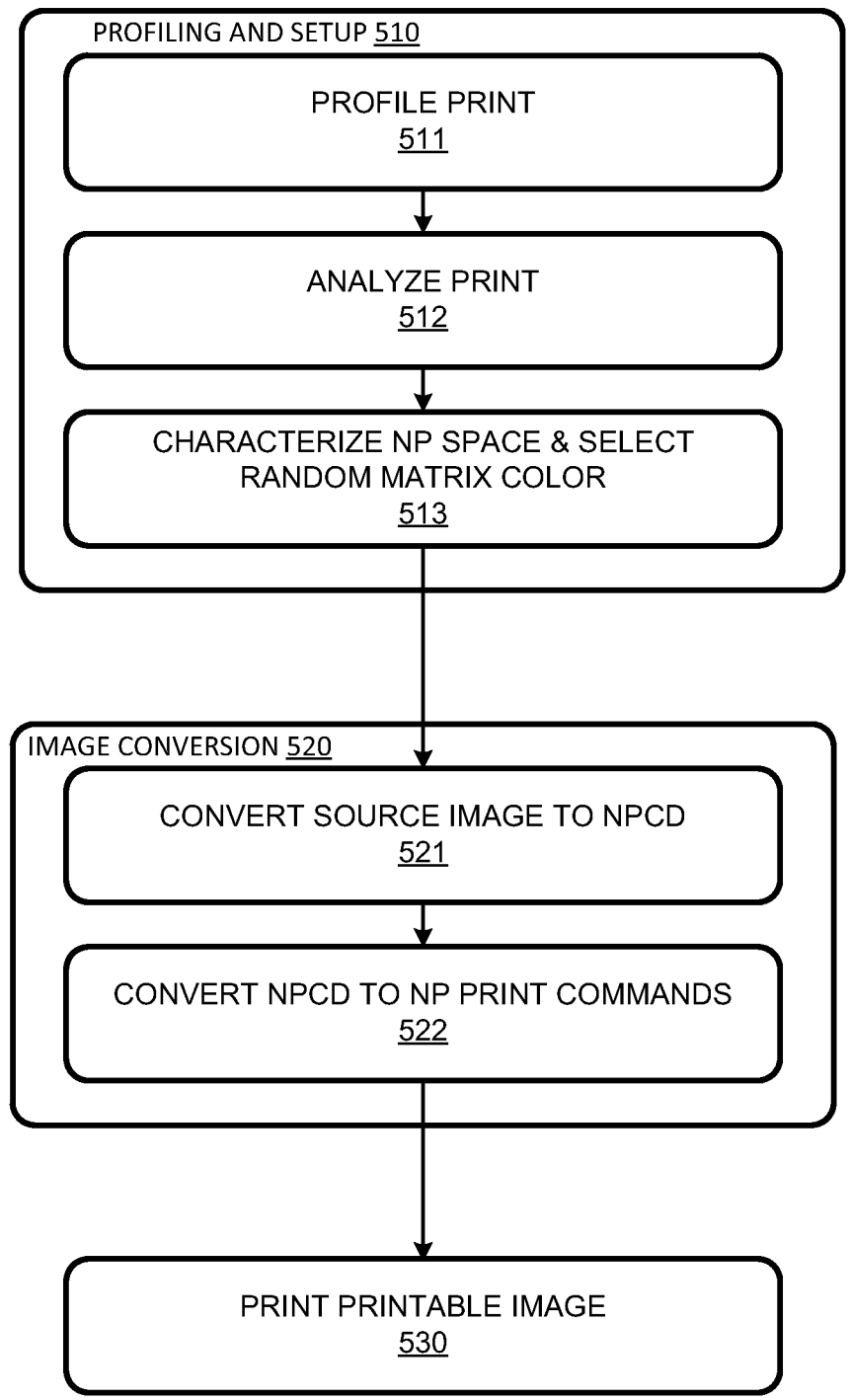
FIG. 5 is a flow chart of a process implemented by the printing system of FIG. 4.

A process 500, flow charted in FIG. 5, is implemented by system 400 at least in part by executing code 427. Process 500 includes three phases, characterization and setup phase 510, image conversion 520, and printing 530. Characterization and setup phase 510 begins with a characterization print. This involves printing a preset characterization image. The characterization image can include an array of squares, with each square corresponding to a different combination of number of drops and inks. For example, if there are four ink colors, e.g., cyan, magenta, yellow and black, and three drop values (zero drops, one drop, two drops) per color, then there can be $3^4$=81 possible Neugebauer primaries, each represented by a respective square. Other numbers of drop sizes and ink colors (e.g., including light cyan, light magenta, red, green, blue, white, gold, silver, and other metallics) can be used.

The squares can be arranged with adjacent boundaries to test for inter-pixel bleeding; alternatively, patterns devoted to testing for inter-pixel bleeding can be used. Such characterization can be done each time a new media type is used or the ink is changed so that the effects of media type, ink variations, as well as other factors are taken into account in characterizing the NP color space. A more common approach uses ramps of single inks at various amounts as well as ramps of some sub-set of secondaries and tertiaries. The ramps help detect both where bleeding occurs as well as where adding more ink no longer helps in terms of reaching further in color space.

At process segment 512, the characterization print is analyzed, e.g., using colorimeter 411. The measured colors of the squares characterize the NP color space at process segment 513. Each NP can be mapped to a color of a standard color space and to the print commands used to produce the display primary. In addition, inter-pixel blending can be analyzed to determine which color noise matrix may be selected, also at process segment 513.

In the case of blue-noise, dispersed-dot dither patterns are constructed by isolating minority pixels as homogeneously as possible and, by doing so, a pattern composed predominantly of high-frequency spectral components is produced. Blue-noise half-toning is preferred for display devices that can accommodate isolated dots such as various video displays and some print technologies such as ink-jet. For print marking engines that cannot support isolated pixels dispersed-dot half-toning is inappropriate. For such cases, clustered-dot half-toning is used to avoid dot-gain instability. Green-noise halftones are clustered-dot blue noise patterns. Such patterns enjoy the blue-noise properties of homogeneity and lack of low frequency texture, but have clusters of minority pixels on blue-noise centers. Green noise is composed predominantly of mid-frequency spectral components. (Credit: this paragraph is adapted from Daniel L. Lau, Robert Ulichney, and Gonzolo R. Arce "Fundamental Characteristics of Halftone Textures: Blue-Noise and Green-Noise" in IEEE Signal Processing Magazine, Vol. 20(2), pp. 28-38, July 2003.)

Image conversion phase 520 converts a source image 451 to a NP printable (and, thus, displayable) image 455. This phase includes a process segment 521 of converting a source image to an NPCD image (a type of DCF image) 453, and a process segment 522 of converting NPCD image 453 to NP printable image 455. NPCD image 453 assigns an ordered cumulative distribution of NP colors to each image pixel. For example, each NP can be assigned an index number and NPs in the NPCD can be arranged in order of their index numbers. Alternatively, the distribution can be in order of increasing or decreasing area coverage or according to some other order.

Figures 6, 7:
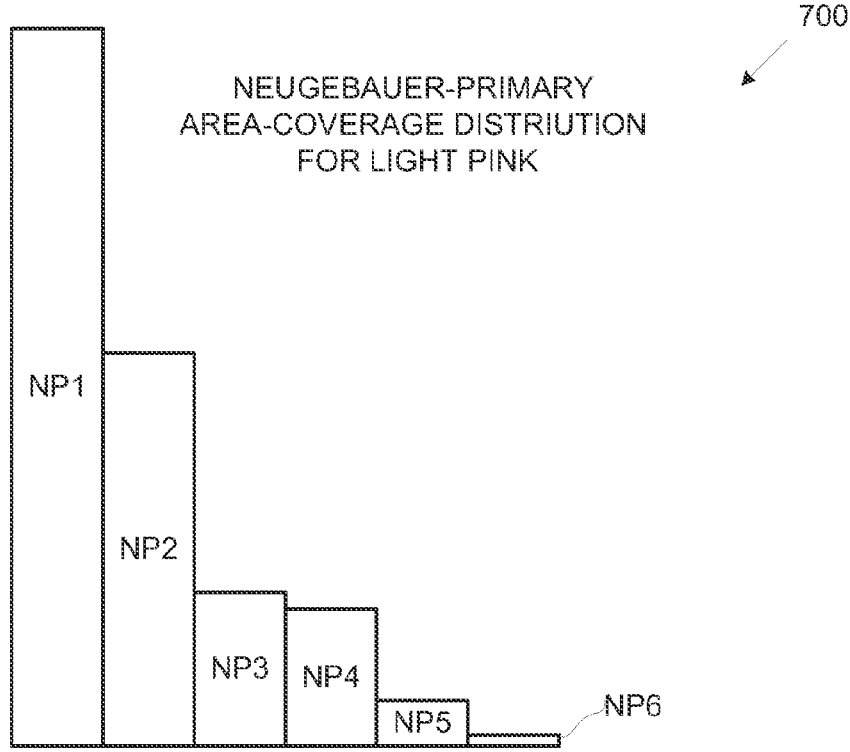
FIG. 6 is a table corresponding to a Neugebauer primary vector for a light pink.
FIG. 7 depicts an area coverage distribution for light pink.

An NP area coverage vector 600 for a light-pink source color is shown in tabular form in FIG. 6. Vector 600 is constituted by six NPs. For example, vector component #1 corresponds to NP index 55, which corresponds to one magenta drop; component #1 has an area coverage proportion of 126 parts per (pp) 256 pixels. For another example, component #5 corresponds to white (W), and thus to no drops. Component #5 has an 8:256 area coverage value. A corresponding area-coverage distribution is shown in FIG. 7.

Figure 8:
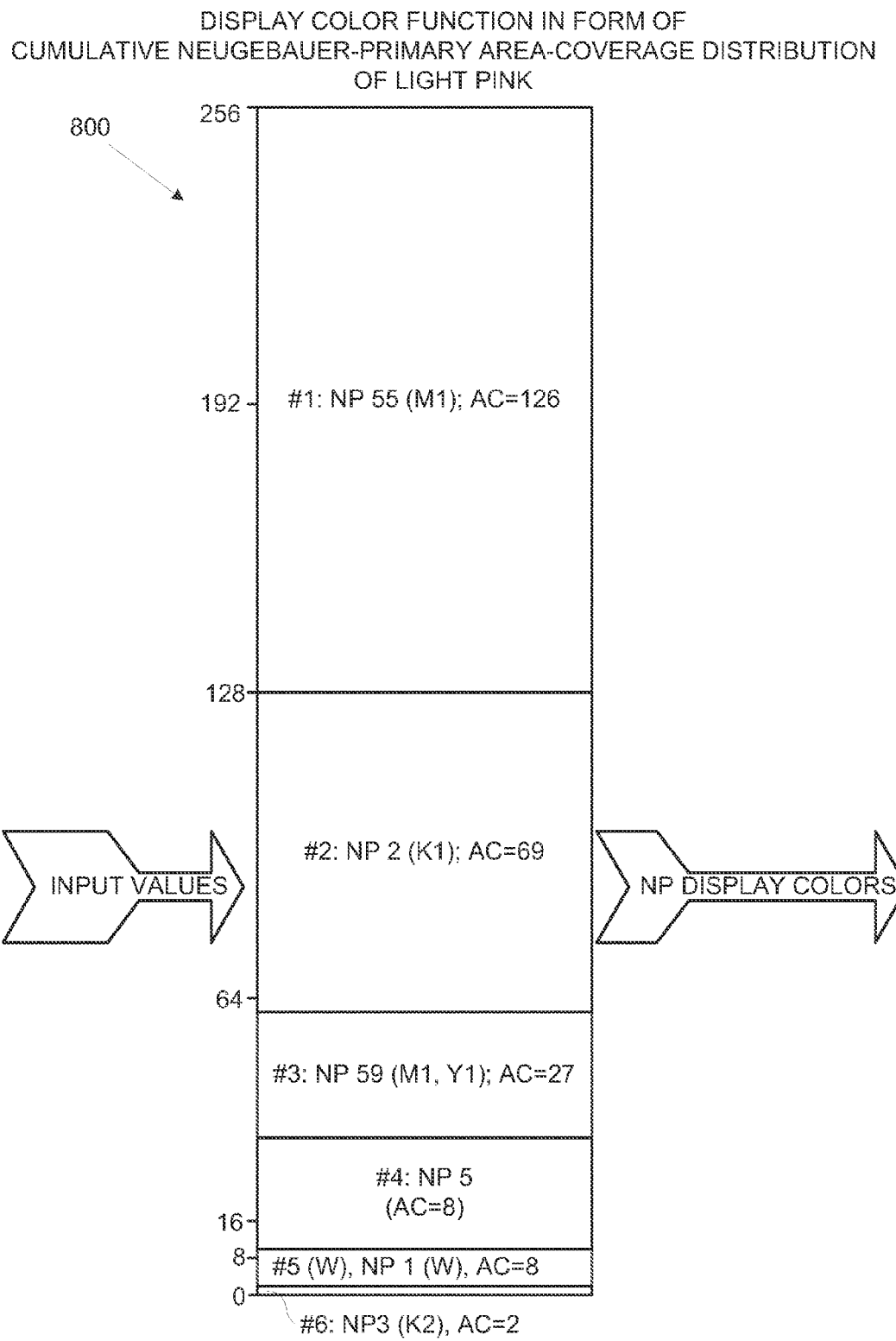
FIG. 8 depicts a display color function for light pink.

An NP cumulative area coverage distribution (NPCD) 800, shown in FIG. 8, can be obtained by "stacking" the component area coverages (e.g., from FIG. 6). In NPCD 800, individual NP distributions are stacked from least prevalent to most prevalent. Alternatively, other orders, e.g., according to index value, are used. As indicated by the large hollow arrows in FIG. 8, NPCD 800 can be used as a DCF look-up table for generating display colors as a function of input values.

Process segment 521 can be implemented by first converting to an NP area coverage vector space image and then converting the NP area coverage vector space image to an NPCD image. However, in system 400, there is a direct conversion from the source image to the NPCD image without explicitly forming an NP area coverage vector image. This conversion is possible due to convexity being preserved between an NP-area-coverage representation and an NPCD representation (i.e., a convex combination of NP area-coverage vectors is a convex combination of NPCDs with the same convex weights).

Process segment 522 involves converting the NPCD image to an NP printable image. This can be a bit map of NP primaries or the print commands used to generate the NP primaries. The NP printable image is obtained by random sampling of NPCDs on a pixel-by-pixel basis or by taking the spatially collocated counterparts of the noise threshold matrices mentioned above. More specifically, the NPCD is treated as a lookup table that converts a random input value to an NP for each image pixel. The use of random input values effectively treats the NP area coverages as probabilities and the NPCDs as cumulative probability distribution functions.

The law of large numbers guarantees that if there is a sufficiently large area of pixels with the same NP area coverage and the NPs at each location are chosen randomly and respecting the NP area-coverage probabilities, over the entire area the NP area coverage (computing the distribution of NPs placed at each pixel randomly from the local NP area coverages) is the same as the per-pixel NP area coverage. The larger the area is, the closer these per-pixel NP area coverage and per-area NP area coverage are.

For each image pixel, the set(s) of values from which a random number is selected is determined by the selection of the quantization threshold matrix noise color at process segment 513. At phase 530, the NP printable image is printed to form printed image 440. Pixels assigned higher quantization thresholds may be precluded from being mapped to certain display color components of a cumulative distribution. For example, as can be gleaned from FIG. 8, a quantization threshold of eight will prevent display color component #6 from being assigned to the respective pixel of the displayable image. Likewise, a quantization threshold of 16 will preclude display color components #5 and #6 from being assigned to the respective displayable image pixel. The loss of opportunities for minority display colors to be represented in the displayable image caused by variable threshold quantization can be pre-compensated by image converter 431. Displayable image 453 can be used to print printable image 455 to yield printed image 440 at process segment and phase 430.

Herein, a "display system" is a system for converting source images into displayable images. The display system can be completely defined in hardware, but, in most cases, it is a combination of software and hardware used to execute the software. The display system may or may not include the display itself. Herein, "generator" and "converter", e.g., generators 102 and 437 and converters 104, 431, and 433, refer to hardware or software-cum-hardware entities that generate or convert images.

Herein, "image" encompasses 1) displayed images in the form of human-viewable light-emitting or reflecting spatial distributions; and 2) computer-readable representations of displayed images. Herein, "source image" encompasses any image that can be converted to a displayable image; herein, a typical source image is a continuous-tone image. Herein, "displayable image" is an image having pixels having display colors assigned to pixels to the exclusion of non-display colors; herein, a typical displayable image is a half-tone image, i.e., an image that requires spatially averaging to create a perception of some colors.

Herein, a "display-color function" (DCF) is a function for generating values representing display colors as a function of an input value; herein, a typical input value is randomly generated. Herein, a "display-color function image" or "DCF image" is an image having pixels with associated DCF functions; herein, a typical DCF function corresponds to a cumulative distribution of display color components of a source image color.

Herein, "spatial threshold quantization matrix" refers to a matrix or array of values that define quantization thresholds for randomly generated values, e.g., on a pixel-by-pixel basis. Such matrices are used herein to shape the spatial frequencies associated with the random values input to a DCF image to yield a displayable image. Such matrices can be characterized by noise colors depending on how they affect low, middle, and high spectral frequencies. In most cases herein, spatial threshold quantization matrices characterized by spectral noise in the green-to-blue color range provide the most uniform and visually pleasing image conversions.

Herein, "display color" encompasses colors that can be displayed directly without relying on spatial averaging by a human viewer. A "display color value" is a vector or scalar value (e.g., an NP index) representing a display color. Herein, "Neugebauer primary" or "NP" refers to a display color determined according to a characterization procedure detailed elsewhere in the literature. "Neugebauer primary (NP) area coverage vector" refers to a vector of area or region coverage values corresponding to a source color. "Neugebauer primary (NP) area coverage vector image" refers to an image having pixels, each of which has a respective NP area coverage vector assigned. "Neugebauer primary (NP) cumulative area coverage distribution" or "NPCD" refers to an indexed cumulative distribution corresponding to an NP area coverage vector. An NPCD can be in the form of a look-up table and used as a DCF for generating displayable images based on input values.

Herein, "processor" encompasses hardware entities including electrically or optically conductive material that can be used to execute computer-executable code. A processor can consist of part of an integrated circuit, an entire integrated circuit, or multiple integrated circuits. In the latter case, a processor can be distributed among devices, e.g., between a computer and a printer of a printing system. Herein, "computer-readable storage media" or "CR-media" refers to non-transitory tangible media in which computer readable code can be encoded. Signals and other non-transitory propagating phenomena are not encompassed by the term "media" as used herein.

Herein, a "system" is a set of interacting elements, wherein the elements can be, by way of example and not of limitation, mechanical components, electrical elements, atoms, instructions encoded in storage media, and process segments. Herein, a "product" is any man-made thing, such as computer-readable storage media. In this specification, related art is discussed for expository purposes. Related art labeled "prior art", if any, is admitted prior art. Related art not labeled "prior art" is not admitted prior art. The illustrated and other described embodiments, as well as modifications thereto and variations thereupon are within the scope of the following claims.

What is claimed is:

1. A display system comprising:
    an image generator to generate from a source image a display-color-function (DCF) image having pixels with respective associated DCFs such that pixels in said DCF image associated with dissimilar colors, each of the DCFs being to convert input values to respective display colors; and
    an image converter to input respective values to the DCFs so as to yield respective display color values to be associated with spatially corresponding pixels of a displayable image.

2. A display system as recited in claim 1 wherein each of said DCFs corresponds to a cumulative distribution of display colors characterizing a source color at a corresponding spatial position of the source image.

3. A display system as recited in claim 2 wherein said image generator includes a random matrix generator to generate said values randomly using a spatial threshold quantization matrix associated with a noise spectrum in a green-to-blue spatial color range.

4. A display system as recited in claim 3 further comprising printer components to print said displayable image, said displayable image associating image pixels with displayable colors, said displayable colors being Neugebauer primaries (NPs), the DCFs corresponding to respective indexed cumulative distributions of NP area coverages.

5. A display system as recited in claim 4 wherein said DCF image generator is to obtain said DCF image without first explicitly generating an NP area coverage vector image.

6. A display method comprising:
    generating, using a processor, a display-color-function (DCF) image from a source image, the DCF image having pixels associated with respective DCFs for converting input values to display colors, such that pixels in said DCF image associated with dissimilar DCFs correspond to pixels in said source image associated with dissimilar colors; and converting, using said processor, the DCF image to a displayable image having pixels associated with respective display colors by inputting respective input values to the DCFs to determine the display colors to be associated with spatially corresponding pixels of said displayable image.

7. A display method as recited in claim 6 further comprising printing said displayable image by depositing ink on a print medium, said displayable image associating image pixels with displayable colors, said displayable colors being Neugebauer primaries (NPs), said DCFs corresponding to respective indexed cumulative distributions of NP area coverages.

8. A display method as recited in claim 7 wherein said generating includes generating the cumulative distributions without previously generating a NP area coverage vector image corresponding to said source image.

9. A display method as recited in claim 7 wherein said converting involves generating said input values randomly.

10. A display method as recited in claim 7 wherein said input values are generated randomly using spatially varying quantization thresholds constituting a quantization threshold matrix associated with a noise color spectrum within a green-to-blue color range.

11. A product comprising computer-readable storage media encoded with code to, when executed by a processor: generate a display-color-function (DCF) image from a source image, said DCF image having pixels with respective DCFs for converting input values to display color values such that pixels in said DCF image associated with dissimilar DCFs correspond to pixels in said source image associated with dissimilar colors; and convert the DCF image to a displayable image having pixels with associated respective display colors determined by inputting respective input values to the respective DCFs.

12. A product as recited in claim 11 wherein said display colors are Neugebauer primaries (NPs).

13. A product as recited in claim 12 wherein each DCF corresponds to a respective cumulative distribution of NP area coverages.

14. A product as recited in claim 11 wherein said code is to generate said input values randomly so as to conform to a spatial quantization matrix characterized by a spatial noise spectrum in the green-to-blue color range.

15. A product as recited in claim 12 wherein said code is to generate said DCF image without first explicitly generating an NP area coverage vector image corresponding to said source image.

* * * * *

UNITED STATES PATENT AND TRADEMARK OFFICE
CERTIFICATE OF CORRECTION

| | | |
|---|---|---|
| PATENT NO. | : 8,576,243 B2 | Page 1 of 1 |
| APPLICATION NO. | : 12/900856 | |
| DATED | : November 5, 2013 | |
| INVENTOR(S) | : Peter Morovic et al. | |

It is certified that error appears in the above-identified patent and that said Letters Patent is hereby corrected as shown below:

In the Claims:

In column 8, line 35, in Claim 1, delete "dissimilar" and insert -- dissimilar DCFs correspond to pixels in said source image associated with dissimilar --, therefor.

In column 8, line 64, in Claim 6, delete "colors," and insert -- colors --, therefor.

Signed and Sealed this
Eleventh Day of February, 2014

Michelle K. Lee
*Deputy Director of the United States Patent and Trademark Office*